US010607329B2

(12) United States Patent
Sunkavalli et al.

(10) Patent No.: US 10,607,329 B2
(45) Date of Patent: Mar. 31, 2020

(54) ILLUMINATION ESTIMATION FROM A SINGLE IMAGE

(71) Applicant: ADOBE INC., San Jose, CA (US)

(72) Inventors: Kalyan K. Sunkavalli, San Jose, CA (US); Xiaohui Shen, San Jose, CA (US); Mehmet Ersin Yumer, San Jose, CA (US); Marc-André Gardner, Québec (CA); Emiliano Gambaretto, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 114 days.

(21) Appl. No.: 15/457,192

(22) Filed: Mar. 13, 2017

(65) Prior Publication Data

US 2018/0260975 A1    Sep. 13, 2018

(51) Int. Cl.
*G06K 9/62*     (2006.01)
*G06T 7/00*     (2017.01)
(Continued)

(52) U.S. Cl.
CPC ............ *G06T 7/00* (2013.01); *G06N 3/0454* (2013.01); *G06N 3/0472* (2013.01); *G06N 3/08* (2013.01);
(Continued)

(58) Field of Classification Search
CPC ............ G06T 7/90; G06T 2207/20084; G06T 2207/10024; G06T 2207/20081
(Continued)

(56) References Cited

U.S. PATENT DOCUMENTS

| | | | | |
|---|---|---|---|---|
| 6,671,400 B1 * | 12/2003 | Ekpar | ............... | G06T 3/4038 382/157 |
| 8,345,921 B1 * | 1/2013 | Frome | ................. | G06K 9/72 382/103 |

(Continued)

OTHER PUBLICATIONS

S. Bell, P. Upchurch, N. Snavely, and K. Bala. Material recognition in the wild with the materials in context database. IEEE Conference on Computer Vision and Pattern Recognition, 2015.
(Continued)

*Primary Examiner* — Solomon G Bezuayehu
(74) *Attorney, Agent, or Firm* — Shook, Hardy & Bacon, LLP

(57) ABSTRACT

Methods and systems are provided for using a single image of an indoor scene to estimate illumination of an environment that includes the portion captured in the image. A neural network system may be trained to estimate illumination by generating recovery light masks indicating a probability of each pixel within the larger environment being a light source. Additionally, low-frequency RGB images may be generated that indicating low-frequency information for the environment. The neural network system may be trained using training input images that are extracted from known panoramic images. Once trained, the neural network system infers plausible illumination information from a single image to realistically illumination images and objects being manipulated in graphics applications, such as with image compositing, modeling, and reconstruction.

11 Claims, 9 Drawing Sheets
(1 of 9 Drawing Sheet(s) Filed in Color)

(51) Int. Cl.
  *G06N 3/04* (2006.01)
  *G06N 3/08* (2006.01)
  *G06N 20/10* (2019.01)
(52) U.S. Cl.
  CPC .... *G06N 20/10* (2019.01); *G06T 2207/10024* (2013.01); *G06T 2207/20076* (2013.01); *G06T 2207/20081* (2013.01); *G06T 2207/20084* (2013.01)
(58) Field of Classification Search
  USPC .......................................................... 382/156
  See application file for complete search history.

(56) References Cited

U.S. PATENT DOCUMENTS

| | | | | |
|---|---|---|---|---|
| 8,965,112 | B1* | 2/2015 | Ibarz | G06K 9/6256 382/105 |
| 10,140,690 | B2 | 11/2018 | Chakraborty et al. | |
| 2006/0103728 | A1* | 5/2006 | Ishigami | H04N 1/6027 348/180 |
| 2006/0160608 | A1* | 7/2006 | Hill | G07F 17/32 463/25 |
| 2012/0155753 | A1* | 6/2012 | Masato | H04N 1/6027 382/162 |
| 2013/0120608 | A1* | 5/2013 | Nakamura | H04N 9/735 348/223.1 |
| 2013/0314402 | A1* | 11/2013 | Furumura | G03B 35/02 345/419 |
| 2014/0225940 | A1* | 8/2014 | Nakagawa | G09G 3/3607 345/690 |
| 2016/0133048 | A1* | 5/2016 | Acree | G06T 15/60 345/426 |
| 2017/0195605 | A1 | 7/2017 | Alves | |
| 2018/0253865 | A1* | 9/2018 | Price | G06K 9/4652 |
| 2018/0359416 | A1 | 12/2018 | Hold-Geoffroy | |
| 2019/0020784 | A1* | 1/2019 | Otani | H04N 1/405 |
| 2019/0096046 | A1 | 3/2019 | Kalantari et al. | |
| 2019/0164261 | A1 | 5/2019 | Sunkavalli et al. | |

OTHER PUBLICATIONS

D.-A. Clevert, T. Unterthiner, and S. Hochreiter. Fast and accurate deep network learning by exponential linear units (ELUs). In International Conference on Learning Representations, 2016.
P. Debevec. Rendering synthetic objects into real scenes: Bridging traditional and image-based graphics with global illumination and high dynamic range photography. In Proceedings of ACM SIGGRAPH, 1998.
D. Eigen and R. Fergus. Predicting depth, surface normals and semantic labels with a common multi-scale convolutional architecture. International Conference on Computer Vision, 2015.
S. Georgoulis, K. Rematas, T. Ritschel, M. Fritz, L. Van Gaol, and T. Tuytelaars. Delight-net: Decomposing reflectance maps into specular materials and natural illumination. arXiv preprint, arXiv:1603.08240, 2016.
S. Ioffe and C. Szegedy. Batch normalization: Accelerating deep network training by reducing Internal covariate shift. Journal of Machine Learning Research, 37, 2015.
D. Kingma and J. Ba. Adam: A method for stochastic optimization. In International Conference on Learning Representations, pp. 1-15, 2015.
P. Krähenjühl and V. Koltun Efficient inference in fully connected CRFs with gaussian edge potentials. In Neural Information Processing Systems, 2012.
T. D. Kulkarni, W. F. Whitney, P. Kohli, and J. Tenenbaum. Deep convolutional inverse graphics network. In NIPS, pp. 2539-2547. 2015.
J.-F. Lalonde and I. Matthews. Lighting estimation in outdoor image collections. In International Conference on 3D Vision, 2014.
S. Lombardi and K. Nishina. Reflectance and illumination recovery in the wild. IEEE Transactions on Pattern Analysis and Machine Intelligence, 38(1)129-141, 2016.
E. Reinhard, W. Heidrich, P. Debevec, S. Pattanaik, G.Ward, and K. Myszkowski. High Dynamic Range Imaging. Morgan Kaufmann, 2 edition, 2010, p. 538.
Q. Shan, R. Adams, B. Curless, Y. Furukawa, and S. M. Seitz. The visual tu ring test for scene reconstruction. In 3DV, 2015.
K. Sunkavalli, F. Romeiro, W. Matusik, T. Zickler, and H. Pfister. What do color changes reveal about an outdoor scene? in IEEE Conference on Computer Vision and Pattern Recognition, 2008.
J. Xiao, K. A. Ehinger, A. Oliva, and A. Torralba. Recognizing scene viewpoint using panoramic place representation. In IEEE Conference on Computer Vision and Pattern Recognition, 2012.
Y. Zhang, J. Xiao, J. Hays, and P. Tan. Framebreak: Dramatic image extrapolation by guided shift-maps. In IEEE Conference on Computer Vision and Pattern Recognition Recognition, pp. 1171-1178, 2013.
T. Zhou, P. Krähenbühl, and A. A. Efros. Learning data driven reflectance priors for intrinsic Image decomposition. In IEEE International Conference on Computer Vision, 2015.
G. Zotti, A.Wilkie, and W. Purgathofer. A Critical Review of the Preetham Skylight Model. WSCG Short Communications Proceedings I, pp. 23-30, 2007.
T. Haber, C. Fuchs, P. Bekaer, H.-P. Seidel, M. Goesele, and H. Lensch. Relighting objects from Image collections. In IEEE Conference on Computer Vision and Pattern Recognition, 2009.
Karsch et al., "Automatic Scene Inference for 3D Object Compositing" published Aug. 2009, ACM Transactions on Graphics, vol. 28, No. 4, Article 106, http://doi.acm.org/10.1145/1559755.1559763, 14 pages.
Lalonde et al., "Extimating Natural Illumination from a Single Outdoor Image", http://graphics.cs.cmu.edu/projects/outdoorIllumination, 8 pages.
Rematas et al., "Deep Reflectance Maps", CVPR paper, Open Access version, provided by the Computer Vision Foundation, http://homes.cs.washington.edu/~krematas/DRM/, pp. 4508-4516.
Barron et al., "Shape, Illumination, and Reflectance from Shading", Department of Electrical Engineering and Computer Science, University of California at Berkeley, supported by NSF GRFP and ONR MURI N00014-10-10933, pp. 1-22.

* cited by examiner

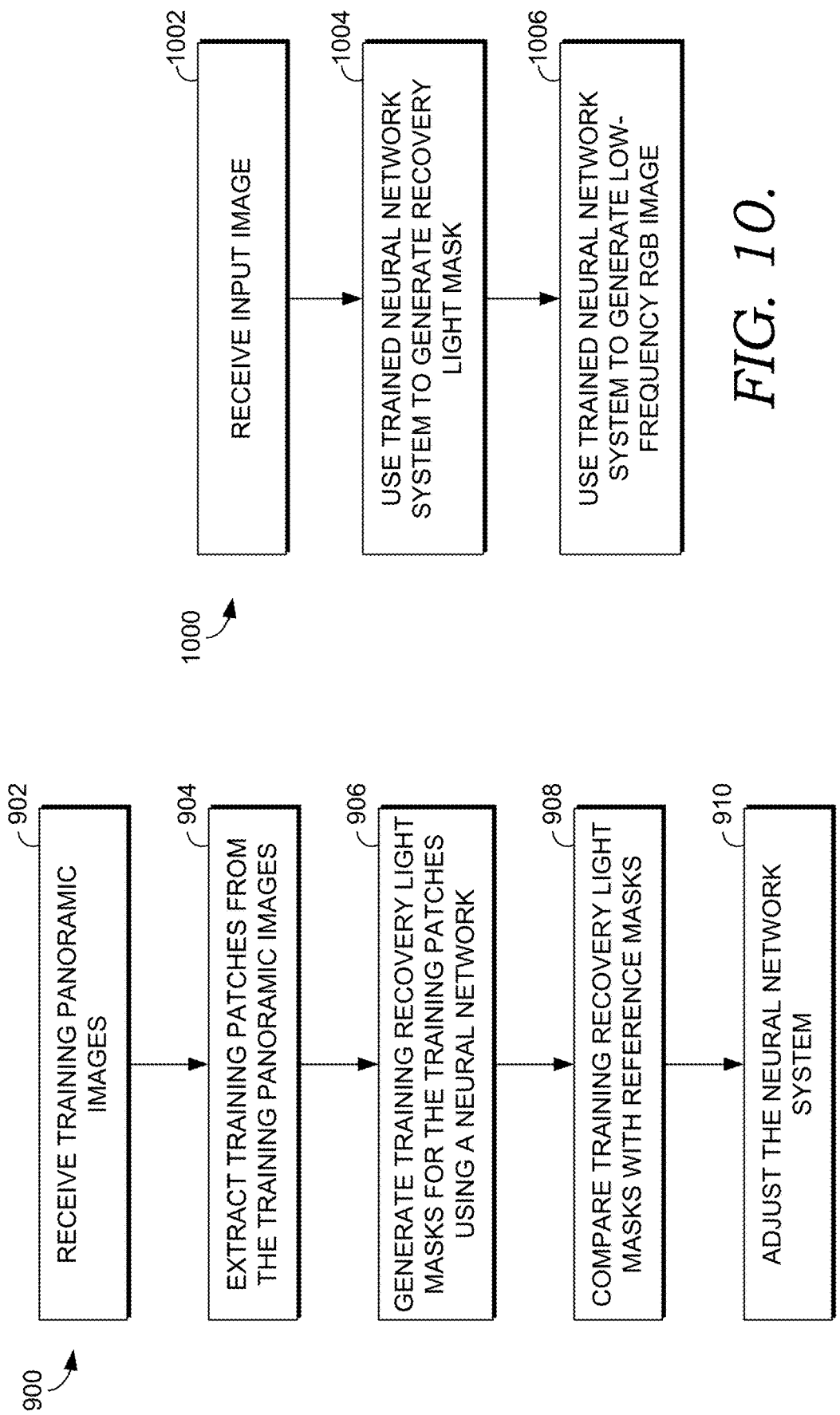

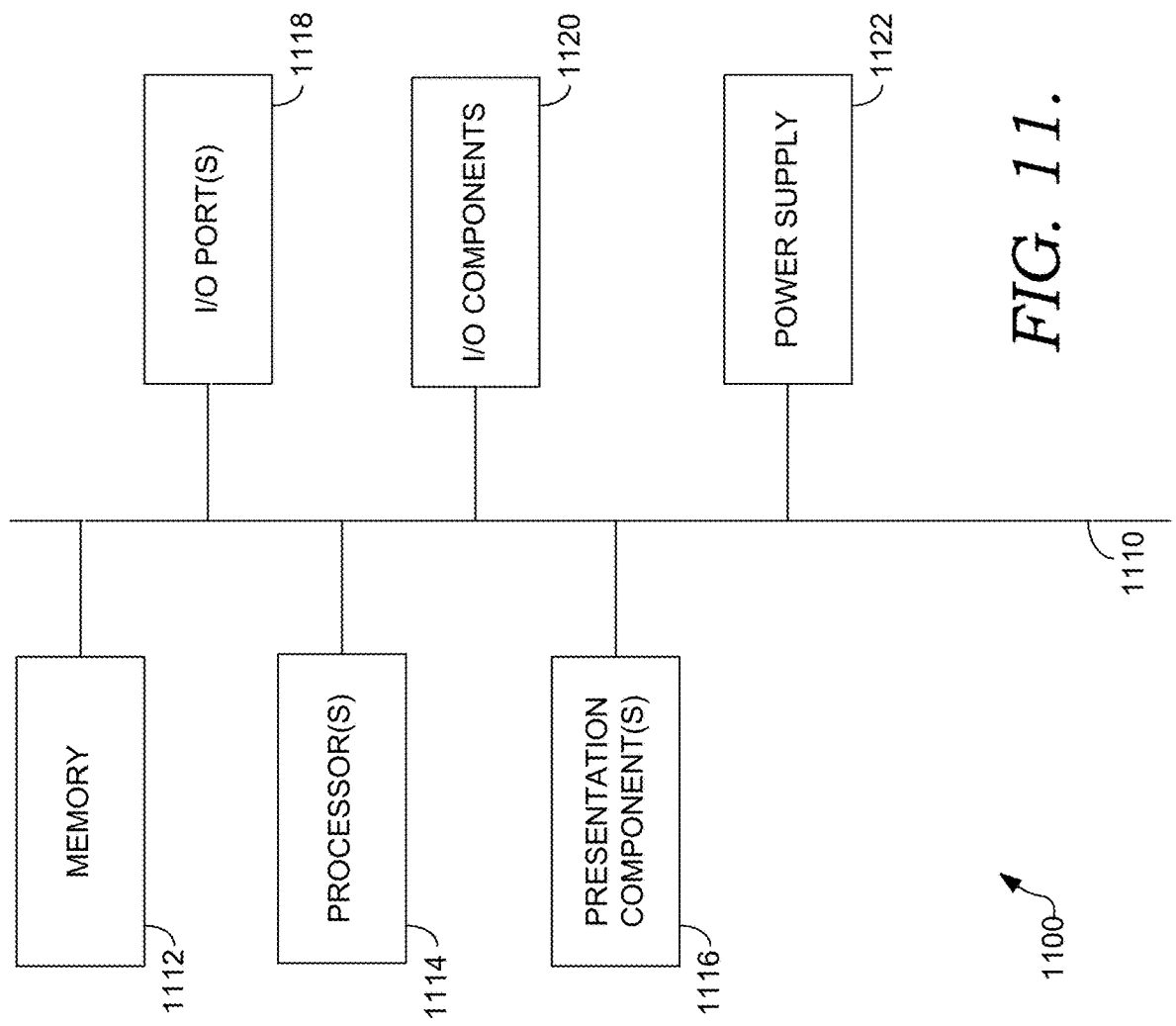

ILLUMINATION ESTIMATION FROM A SINGLE IMAGE

BACKGROUND

When using graphics applications, users often desire to manipulate an image by compositing objects into the images or performing scene reconstruction or modeling. To be effective and provide realistic results, these processes depend on recovering the illumination that contributes to the original image. Traditional methods of recovering illumination have been limited to illumination directly visible from the actual image. Such methods do not always provide a realistic illumination recovery because images often represent only a portion of the environment in which the scene resides, and the illumination of a scene may be formed by light sources that are not directly visible within an image itself. For example, many standard images provide a limited view, such as approximately a 60-degree view to a 90-degree view, while the entire 360-degree environment may include light sources illuminating the scene but that are outside that limited view shown in the image.

There are existing methods for estimating illumination from an entire panoramic environment, but they lack the robustness to be generally applicable to many indoor scenes. For example, current methods for recovery of outdoor scenes infer sky illumination and do not work for images of scenes with other types of illumination, such as indoor scenes. Additionally, there are data-driven approaches for indoor scenes that compare the illumination of an input image to known environment maps and determine the closest estimation between the known environment maps and the image. Such an approach, however, assumes that there will be a close estimate to the actual environment of the input image that is stored in the database of known environments. Considering the wide variety of illumination that occurs in indoor scenes, this assumption may not always hold true. Further, other methods utilize deep learning methods to recover reflectance maps, but these methods are based on a small amount of data and many assumptions that limit applicability of these methods. For instance, current deep learning methods for estimating illumination can be used only for images having a predefined object of a certain class. The predefined object must be at or near the center of the captured scene and must be segmented from the background. Such strong assumptions limit the use of these methods to a very narrow class of images. Accordingly, current systems do not provide accurate or robust methods for estimating illumination of a panoramic environment for a single image of an indoor scene.

SUMMARY

Embodiments of the present invention are directed towards a system trained to estimate illumination for an entire panoramic environment encompassing a scene represented in a single image without the panoramic environment being known. In accordance with embodiments of the present invention, such a system can be created using one or more neural networks. In this regard, neural networks can be trained to assist in estimating illumination by generating recovery light masks and, in some aspects, low-frequency RGB images. The system can be trained to generate recovery light masks and low-frequency RGB images that accurately reflect an entire panoramic to which the scene in a single image belongs. The recovery light masks may indicate a probability of each pixel in the panoramic being a light source while the low-frequency RGB images indicate low-frequency information, such as coarse color distribution estimations, of the panoramic. In other words, the system uses a single image to infer illumination information, including locations of light sources and low-frequency information, that may be present in areas not captured in the single image. Such a system may be comprised of multiple neural networks.

Training of the neural network system is accomplished using a training data set of panoramic images. A subset of the images in the training dataset may be labeled to indicate whether a pixel is a light source or not a light source, and the labeled data may be used to train a classifier to create binary light masks indicating whether each pixel is a light source or is not a light source for the entire training data set. The panoramic images, patches, or portions of the panoramic images, and binary light masks are used to train the neural network to generate training recovery light masks and training low-frequency RGB images from each patch. These training masks are compared to the binary light masks and the training panoramic images to determine errors, which are used to adjust the system to avoid similar errors in future iterations. Upon completion of training, such a system may be used to generate recovery light masks and low-frequency RGB images for an input image without a known panoramic environment. The output of the system may then be used as estimations of the illumination for the image to accurately illuminate composite objects or an entire scene for scene reconstruction.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

This patent or application file contains at least one photograph executed in color. Copies of this patent or patent application publication with color photograph(s) will be provided by the Office upon request and payment of any necessary fee.

The present invention is described in detail below with reference to the attached drawing figures and photograph, wherein:

FIG. 9 depicts a flow diagram showing a method for training a neural network system to estimate illumination, in accordance with embodiments of the present invention;

FIG. 10 depicts a flow diagram showing a method for generating recovery light masks and low-frequency RGB images to estimate illumination, in accordance with embodiments of the present invention; and FIG. 11 is a block diagram of an example operating device in which embodiments of the present disclosure may be employed.

DETAILED DESCRIPTION

Figure 1:
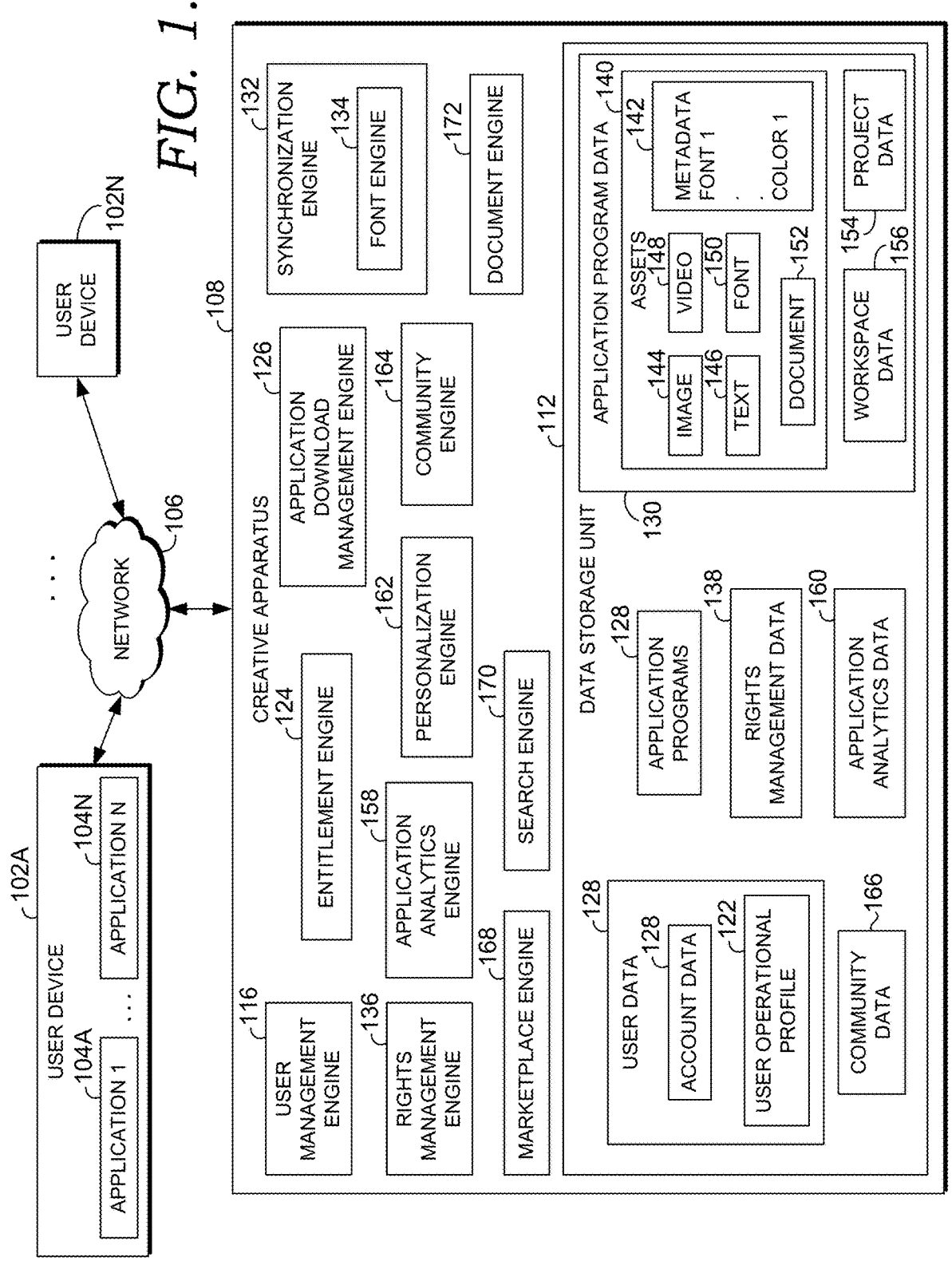
FIG. 1 depicts a diagram of a computing environment in which one or more embodiments of the present disclosure can be practiced, in accordance with various embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, users desire to manipulate digital images through a graphics application, such as manipulations performed in image composition, scene reconstruction, and 3D modeling. When compositing objects into an image, it is important to light the objects appropriately for the image to achieve a realistic appearance. Additionally, for scene reconstruction and modeling, an estimation of the illumination is often required to produce accurate geometry. Accordingly, an understanding of the illumination affecting the original input image is important. Sources of illumination are not always directly visible in the image itself, yet those sources may play a role in the overall illumination. For instance, the angle of view is a measure of the angular extent to which a given scene is imaged by a camera and, with a standard lens, will often be no more than 100 degrees. There may be sources of light, such as a lamp, that are beyond the scope of the angle of view for a scene but that nonetheless illuminate parts of the scene that are imaged. In this way, an accurate estimation of illumination for a single image involves estimating illumination for an entire 360-degree environment that includes the portion captured in the image.

Accordingly, embodiments of the present invention are directed to facilitating accurate illumination estimation of a panoramic environment based on a single image depicting a portion of that environment. Illumination estimation may be accomplished through generation of recovery light masks and, in some aspects, low-frequency RGB images for each input image. As used herein, an input image refers to a single image depicting less than 360 degrees of the environment in which the image is taken. An input image may be a standard RGB image and, in some aspects, is a low-dynamic range (LDR) image, such as a JPEG image file. In other aspects, the input image is a high-dynamic range (HDR) image. A panoramic environment refers to an environment that includes and is larger than the scene, such as an indoor scene, depicted in the input image. The panoramic environment may comprise a 360-degree view, but it is contemplated that the panoramic environment may include a view less than 360 degrees but larger than the view captured in the input images.

A recovery light mask, as used herein, refers to an imaging mask indicating probabilities of whether each pixel in the mask is a light source, and a low-frequency RGB image refers to an image mask that indicates low-frequency information, such as a coarse estimation of color distribution that depicts general locations of different colors and semantic distinctions between walls, floors, ceilings, and the like. The recovery light mask and the low-frequency RGB image for an input image represent a plausible panoramic environment, not just the narrow view of the scene captured in the input image. In this regard, the recovery light mask and RGB image provide illumination information inferred from the input image but that is not directly visible in the input image.

At a high level, realistic illumination estimations can be generated by a neural network system. A neural network is a computational approach loosely based on how the brain solves problems using large clusters of connected neurons. Neural networks are self-learning and trained to generate output reflecting a desired result. As described herein, a neural network system, such as an illumination estimation neural network system, can be trained using at least one neural network within the system. In such a system, a neural network can be trained to infer, from a single input image, an estimation of the illumination of an environment that includes a scene depicted in the input image and can generate output representing that estimation. Although generally described as one neural network, any number of neural networks can be trained in accordance with embodiments described herein.

The neural network may be part of a dual-branch network architecture. The network architecture utilizes an encoder stage to encode an input image, such as an jpeg image file, into an intermediate representation. In some aspects, the intermediate representation comprises 1024 floating point values. After encoding into the intermediate representation, the network is divided into two branches operating from the same intermediate representation. One such branch generates a recovery light mask from the intermediate representation while the other branch creates a low-frequency RGB image.

In training the neural network to estimate illumination for a single image, training images are used as training input. In addition to being used as input, the training images are used as references images or to generate references. A references, also known as a ground truth, may be compared to the output of the neural network system to help train the neural network. For the low-frequency RGB images, the training images themselves may be used as references images and compared to the low-frequency RGB images output by the system, while reference light masks are used as references to compare with the recovery light masks that are generated. The reference light masks may be created from the training images. For example, in some aspects, these reference light masks are binary light masks that indicate whether each pixel within a panoramic environment encompassing the training image is a light source or not a light source. The binary light masks may be created using one or more linear support vector machine classifiers that are initially trained on a subset of manually labeled training images.

In embodiments, the binary light masks and the original training images are compared to the recovery light masks and low-frequency RGB images, respectively, generated by the neural network in training to determine errors between the output of the neural network system and the references. Such errors are then fed back through the neural network system to appropriately train the neural network, for example, by adjusting the weight of the network connections to reduce the value of the errors. This process can be repeated for a sufficiently large number of training cycles until the neural network system converges to a state where the error of the calculations is small enough such that the output reach a desired threshold level of similarity to the references.

Example Computing Environment

Turning to FIG. 1, FIG. 1 depicts an environment 100 in which one or more embodiments of the present disclosure can be practiced. The operating environment 100 includes one or more user devices, such as a user devices 102A-102N. Examples of the user devices include, but are not limited to, a personal computer (PC), tablet computer, a desktop computer, a processing unit, any combination of these devices, or any other suitable device having one or more processors. Each user device 102A-102N may include at least one application supported by a creative apparatus 108. It is to be appreciated that the following description may generally refer to the user device 102A as an example device and that any other user device can be used.

A user of the user device 102A may utilize various products, applications, or services supported by the creative apparatus 108 via a network 106. The user devices 102A-102N may be operated by various users. Examples of such users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manages digital experiences.

A digital tool, as described herein, includes a tool that is used for performing a function or a workflow electronically. Examples of a digital tool include, but are not limited to, content creation tools, content editing tools, content publishing tools, content tracking tools, content managing tools, content printing tools, content consumption tools, any combination of these tools, or any other tool that can be used for creating, editing, managing, generating, tracking, consuming or performing any other function or workflow related to content. A digital tool includes the creative apparatus 108.

Digital experience, as described herein, includes an experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, images, videos, websites, webpages, user interfaces, menu items, tool menus, magazines, slideshows, animations, social posts, comments, blogs, data feeds, audio, advertisements, vector graphics, bitmaps, documents, any combination of one or more content, or any other electronic content.

User devices 102A-102N may be connected to a creative apparatus 108 via the network 106. Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 may be implemented using one or more servers, one or more platforms with corresponding application programming interfaces, cloud infrastructure, and the like. In addition, each engine within the creative apparatus 108 may also be implemented using one or more servers, one or more platforms with corresponding application programming interfaces, cloud infrastructure, and the like. The creative apparatus 108 also includes a data storage unit 112. The data storage unit 112 may be implemented as one or more databases or one or more data servers. The data storage unit 112 includes data that is used by the engines of the creative apparatus 108.

A user of the user device 102A visits a webpage or an application store to explore applications supported by the creative apparatus 108. In embodiments, the creative apparatus 108 provides the applications as a software as a service (SaaS), as a standalone application that can be installed on the user device 102A, or as a combination thereof. The user can create an account with the creative apparatus 108 by providing user details and creating login details. Alternatively, the creative apparatus 108 can automatically create login details for the user in response to receipt of the user details. In some embodiments, the user is also prompted to install an application manager on the user device 102A. The application manager enables the user to manage installation of various applications supported by the creative apparatus 108 and also to manage other functionalities, such as updates, subscription accounts, and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment may be based on one or more products chosen by the user. Based on payment details of the user, a user operational profile 122 may be generated by an entitlement engine 124. The user operational profile 122 is stored in the data storage unit 112 and indicates entitlement of the user to various products or services. The user operational profile 122 also indicates type of user, i.e. free, trial, student, discounted, or paid. In some embodiment, the user management engine 116 and the entitlement engine 124 are one single engine performing the functionalities of both the engines.

The user can then install various applications supported by the creative apparatus 108 via an application download management engine 126. Application installers or application programs 128 present in the data storage unit 112 are fetched by the application download management engine 126 and made available to the user directly or via the application manager. In one embodiment, an indication of all application programs 128 are fetched and provided to the user via an interface of the application manager. In another embodiment, an indication of application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation, and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user may use one or more application programs 104A-104N installed on the user device to create one or more projects or assets. In addition, the user may also have a workspace within each application program. The workspace, as described herein, includes setting of the application program, setting of tools or setting of user interface provided by the application program, and any other setting or properties specific to the application program. Each user can have his or her own workspace. The workspace, the projects, and/or the assets can be stored as application program data 130 in the data storage unit 112 by a synchronization engine 132. Alternatively or additionally, such data can be stored at the user device, such as user device 102A.

The application program data 130 may include one or more assets 140. The assets 140 may be a shared asset that the user wants to share with other users or that the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset 140 includes only the metadata 142.

The application program data 130 may further include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiment.

A user may operate one or more user devices 102A to access data. In this regard, the application program data 130 is accessible by a user from any device, including a device that was not used to create the assets 140. This access is achieved by the synchronization engine 132 that stores the application program data 130 in the data storage unit 112 and enables the application program data 130 to be available for access by the user or other users via any device. Before accessing the application program data 130 by the user from any other device or by any other user, the user or the other user may need to provide login details for authentication if not already logged in. In some cases, if the user or other users are logged in, a newly created asset or updates to the application program data 130 are provided in real time. The rights management engine 136 is also called to determine whether the newly created asset or the updates can be provided to the other user or not. The workspace data 156 enables the synchronization engine 132 to provide a same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. Such synchronization generally happens in real time. Similarly, synchronization of any type of the application program data 130 can be performed.

In some embodiments, user interaction with the applications 104 is tracked by an application analytics engine 158 and stored as application analytics data 160. The application analytics data 160 may include, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the applications 104 that enables the application to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" a maximum number of times. The output of the application analytics engine 158 is used by a personalization engine 162 to personalize tool menu for the user to show "Tool 4" on top. Other types of personalization can also be performed based on the analytics data 160. In addition, the personalization engine 162 can also use the workspace data 156 or the user data 118, including user preferences, to personalize one or more application programs 128 for the user.

In some embodiments, the application analytics data 160 includes data indicating a status of project of the user. For example, if the user was preparing an article in a digital publishing application and the only step left when the user last quit the digital publishing application was publishing the prepared article, then the application analytics engine 158 tracks the state so that when the user next opens the digital publishing application on another device, the state and options are provided to the user for publishing using the digital publishing application or any other application. In addition, while preparing the article, a recommendation may also be made by the synchronization engine 132 to incorporate some of other assets 140 saved by the user and relevant for the article. Such a recommendation may be generated using one or more engines, as described herein.

In embodiments, the creative apparatus 108 also includes a community engine 164, which enables creation of various communities and collaboration among the communities. A community, as described herein, includes a group of users that share at least one common interest. The community can be closed, i.e., limited to a number of users, or can be open, i.e., anyone can participate. The community enables the member users to share each other's work and comment on or like each other's work. The work includes the application program data 130. The community engine 164 stores any data corresponding to the community, such as work shared on the community and comments or likes received for the work as community data 166. The community data 166 may also include notification data and may be used for notifying other users by the community engine in case of any activity related to the work or new work being shared. The community engine 164 works in conjunction with the synchronization engine 132 to provide collaborative workflows to the user. For example, the user can create an image and request an expert opinion or expert editing. An expert user can then either edit the image as per the user's liking or can provide expert opinion. The editing and providing of the expert opinion by the expert is enabled using the community engine 164 and the synchronization engine 132. In collaborative workflows, a plurality of users are assigned different tasks related to the work.

The creative apparatus 108 may also include a marketplace engine 168 for providing a marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

In embodiments, the creative apparatus 108 also includes a document engine 172 for providing various document related workflows, including electronic or digital signature workflows, to the user. The document engine 172 may store documents as the assets 140 in the data storage unit 112 or may maintain a separate document repository (not shown in FIG. 1).

Figure 2:
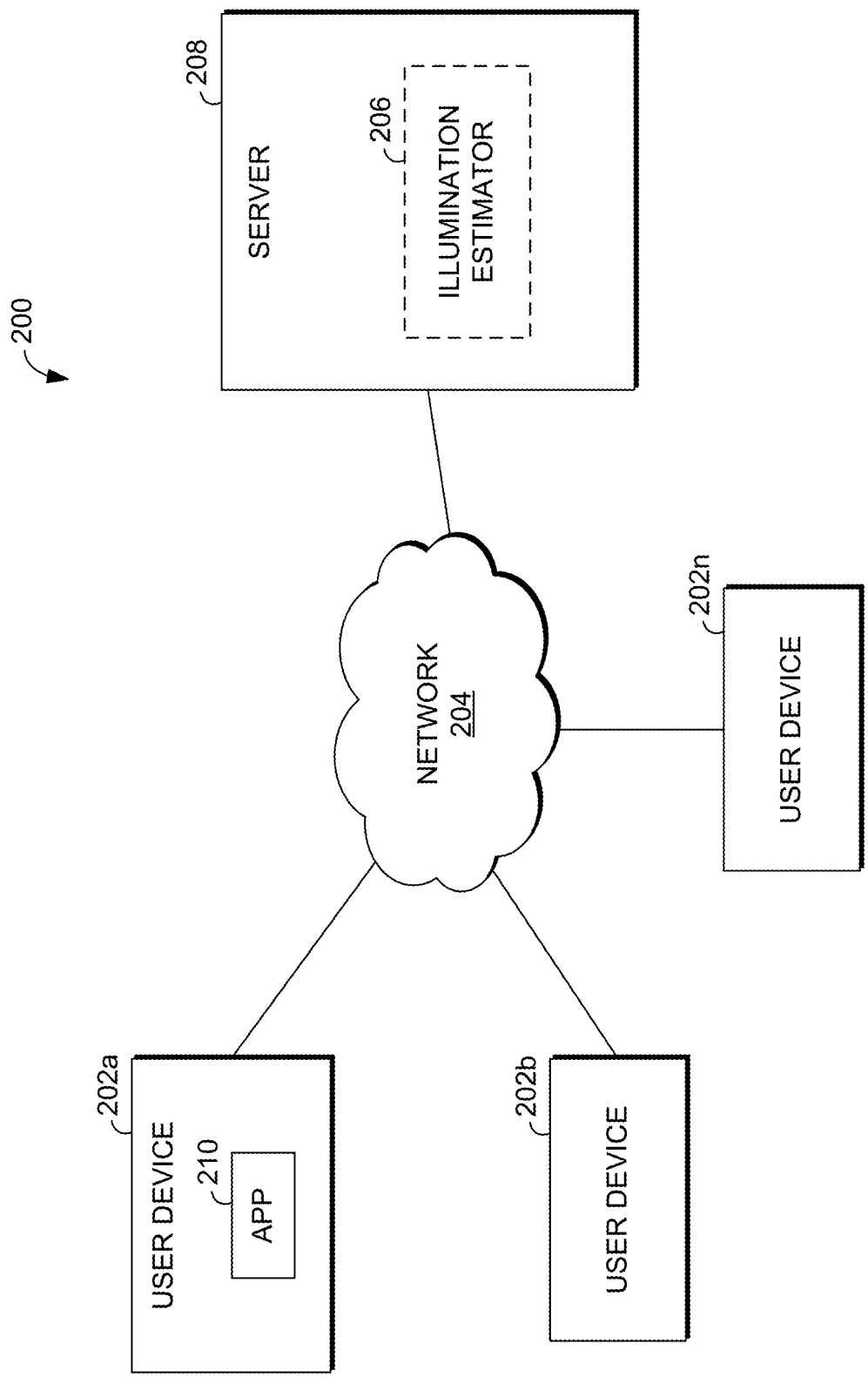
FIG. 2 depicts an example configuration of an environment in which some implementations of the present disclosure can be employed, in accordance with various embodiments of the present disclosure.

In accordance with embodiments of the present invention, application programs 128 may include an application, such as application 210 of FIG. 2, that facilitates estimating illumination for images. Such an application may be provided to the user device 102A so that the illumination estimation application operates via the user device. In another embodiment, such an illumination estimator can be provided as an add-on or plug-in to an application, such as a design or image processing application.

Example Illumination Estimation Environment

FIG. 2 depicts an example configuration of an environment in which some implementations of the present disclosure can be employed to estimate illumination of an image. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

It should be understood that environment 200 shown in FIG. 2 is an example of one suitable operating environment. Among other components not shown, environment 200 includes a number of user devices, such as user devices 202a and 202b through 202n, network 204, and server(s) 208. Each of the components shown in FIG. 2 may be implemented via any type of computing device, such as one or more of computing device 1100 described in connection to FIG. 11, for example. These components may communicate with each other via network 204, which may be wired, wireless, or both. Network 204 may include multiple networks, or a network of networks, but is shown in simple form so as not to obscure aspects of the present disclosure. By way of example, network 204 can include one or more wide area networks (WANs), one or more local area networks (LANs), one or more public networks such as the Internet, and/or one or more private networks. Where network 204 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 204 is not described in significant detail.

It should be understood that any number of user devices, servers, and other components may be employed within environment 200 within the scope of the present disclosure. Each may comprise a single device or multiple devices cooperating in a distributed environment.

User devices 202a through 202n may be any type of computing device capable of being operated by a user. For example, in some implementations, user devices 202a through 202n are the type of computing device described in relation to FIG. 11. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

User devices 202a through 202n may include one or more processors and one or more computer-readable media. The computer-readable media may include computer-readable instructions executable by the one or more processors. The instructions may be embodied by one or more applications, such as application 210 shown in FIG. 2. Application 210 is referred to as a single application for simplicity, but its functionality can be embodied by one or more applications in practice. As indicated above, the other user devices can include one or more applications similar to application 210.

Application 210 may generally be any application capable of facilitating the exchange of information between user devices 202a through 202n and the server(s) 208 in carrying out illumination estimation of an input image. In some implementations, application 210 comprises a web application that can run in a web browser and could be hosted at least partially on the server-side of environment 200. In addition, or instead, application 210 may comprise a dedicated application, such as an application having image processing functionality. In some cases, application 210 is integrated into the operating system (e.g., as a service). It is therefore contemplated herein that "application" be interpreted broadly.

In accordance with embodiments herein, application 210 can facilitate estimating illumination of an image from a single input image. Estimating illumination comprises estimating illumination for a panoramic environment that includes what is captured in the input image. Therefore, the illumination that is estimated may include identification and placement of light sources and low-frequency information outside the view shown in the input image.

To estimate illumination, a user can select or input an image or picture from which illumination is estimated. For example, a user may select a desired image from a repository, for example, stored in a data store accessible by a network or stored locally at user device 202a. Based on the input image, estimations of illumination can be provided through a recovery light mask and, in some embodiments, a low-frequency RGB image, which both indicate illumination information relating to a panoramic environment that includes the input image. The illumination information may be provided directly to the user via user device 202a. In this regard, the recovery light mask and low-frequency RGB image may be displayed via a display screen of user device 202a. Alternatively, the recovery light mask and low-frequency RGB image may not be displayed directly to the user but, rather, may be used to automatically adjust the illumination of one or more aspects of the input image, a copy of the input image, or another image or digital file. For example, when a user is compositing an object into the input image, the illumination information (i.e., the recovery light mask and low-frequency RGB image) for the original input image is automatically used to adjust the illumination of the object within a composited image to achieve a realistic appearance and integration of the composite object.

As described herein, server 208 can facilitate estimating illumination from a single image via illumination estimator 206. Server 208 includes one or more processors, and one or more computer-readable media. The computer-readable media includes computer-readable instructions executable by the one or more processors. The instructions may optionally implement one or more components of illumination estimator 206, described in additional detail below.

Illumination estimator 206 trains and operates a neural network system to estimate illumination for an entire panoramic environment encompassing a scene represented in a single image without the panoramic environment being known. The neural network system trained and operated by the illumination estimator 206 may be comprised of one or more neural networks trained to generate designated output. For example, a neural network system may include a light mask neural network that generates recovery light masks for the input images and a RGB image neural network that generates low-frequency RGB images for input images. Alternatively, the neural network system may comprise a single neural network for generating both recovery light masks for the input images and low-frequency RGB images.

At a high level, illumination estimator 206 trains a neural network system to generate recovery light masks and low-frequency RGB images based on input images. An input image generally refers to one or more images provided to the neural network system, or portion thereof. Such an input image may be a LDR image, such as a JPEG image file, or may include a HDR image. Input images may also represent a portion of an indoor scene and have an angle of view of 100 degrees or less.

The input image represents a portion of a larger scene or environment, and illumination estimator 206 may be trained to estimate illumination not only from the portion shown in the input image but from the entire scene. The estimated illumination is provided in the form of the recovery light mask and, in some implementations, the low-frequency RGB image that are generated by the neural network system. As previously mentioned, a recovery light mask indicates a probability of each pixel within the entire scene that encompasses the input image is a light source, and a low-frequency RGB image provides low-frequency information, such as coarse estimation of color distribution, of the entire scene.

Prior to generating recovery light masks and low-frequency RGB images solely from input images, the neural network system is trained. The neural network system is trained using input images referred to herein as training input images. These training input images may be similar to the input images described above, but they are extracted from a panoramic image showing the larger scene or environment. In this way, the scene beyond what is represented in the training input image is known. Training input images are used to train the neural network system to estimate illumination by generating output in the form of training recovery light masks and training low-frequency RGB images. This training output may be compared to one or more references, which may comprise the panoramic images or may be derived from the panoramic images. The neural network system can be modified or adjusted based on the comparisons between the training output and the references such that the quality of subsequently generated output increases.

For cloud-based implementations, the instructions on server 208 may implement one or more components of illumination estimator 206, and application 210 may be utilized by a user to interface with the functionality implemented on server(s) 208. In some cases, application 210 comprises a web browser. In other cases, server 208 may not be required. For example, the components of illumination estimator 206 may be implemented completely on a user device, such as user device 202a. In this case, illumination estimator 206 may be embodied at least partially by the instructions corresponding to application 210. Thus, it should be appreciated that illumination estimator 206 may be provided via multiple devices arranged in a distributed environment that collectively provide the functionality described herein. Additionally, other components not shown may also be included within the distributed environment. In addition, or alternatively, illumination estimator 206 may be integrated, at least partially, into a user device, such as user device 202a. Furthermore, illumination estimator 206 may at least partially be embodied as a cloud computing service.

Figure 3:
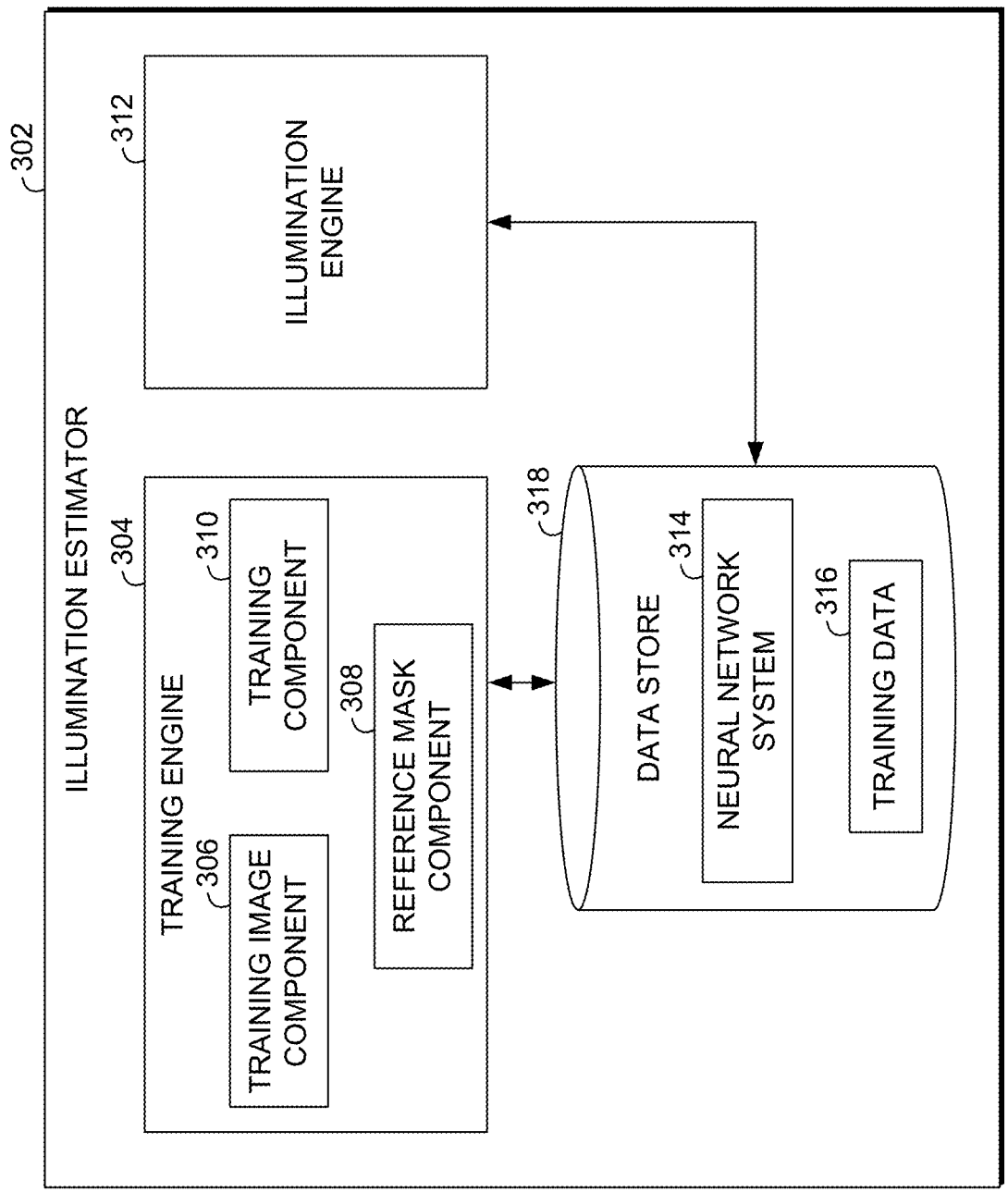
FIG. 3 depicts aspects of an illustrative illustration estimation system, in accordance with various embodiments of the present disclosure.

Referring to FIG. 3, aspects of an illustrative illumination estimating system are shown, in accordance with various embodiments of the present disclosure. Illumination estimator 302 may include training engine 304, illumination engine 312, and data store 318. The foregoing components of illumination estimator 302 may be implemented, for example, in operating environment 200 of FIG. 2. In particular, those components may be integrated into any suitable combination of user devices 202a and 202b through 202n, and server(s) 208.

Data store 318 may store computer instructions (e.g., software program instructions, routines, or services), data, and/or models used in embodiments described herein. In some implementations, data store 318 stores information or data received via the various components of illumination estimator 302 and provides the various components with access to that information or data as needed. Although depicted as a single component, data store 318 may be embodied as one or more data stores. Further, the information in data store 318 may be distributed in any suitable manner across one or more data stores for storage (which may be hosted externally or internally).

In embodiments, data stored in data store 318 includes training data 316. Training data generally refers to data used to train a neural network, or portion thereof. As such, training data 316 can include references, training input images, training panoramic images, training light recovery masks, training low-frequency RGB images, and/or binary light masks. In some cases, illumination estimator 302 receives data from user devices (e.g., an input image received by user device 202a or another device associated with a user, via, for example, application 210). In other cases, data is received from one or more data stores in the cloud.

Data store 318 may also be used to store neural network system 314. Such a neural network system may be comprised of one or more neural networks, such as a light mask neural network and/or a RGB image neural network.

Training engine 304 may be used to train neural network system 314 to estimate illumination of an image. As depicted in FIG. 3, training engine 304 includes a training image component 306, a reference mask component 308 and a training component 310. Although these components are illustrated separately, it can be appreciated that the functionality described in association therewith can be performed by any number of components.

Training image component 306 generates training input images to be fed into the neural network system 314 for training purposes. The training input images may represent a portion of a larger indoor scene (e.g., an indoor scene), and may correspond to a panoramic image of that larger scene. In some aspects, the training input image includes at least one of a wall, a floor, or a ceiling, and may use a standard camera lens projection with an angle of view being 100 degrees or less. Further, the training input images may comprise LDR image types, such as a JPEG. An LDR image with an angle of view no higher than 100 degrees that represents images can be captured by most cameras and smartphones. In this way, input images to be used by the neural network system do not necessarily need to be captured using specialized cameras or advanced camera technology. However, it is completed that other image file types, such as HDR images, and images with angle of views greater than 100 degrees may be used as input images.

Figure 5:
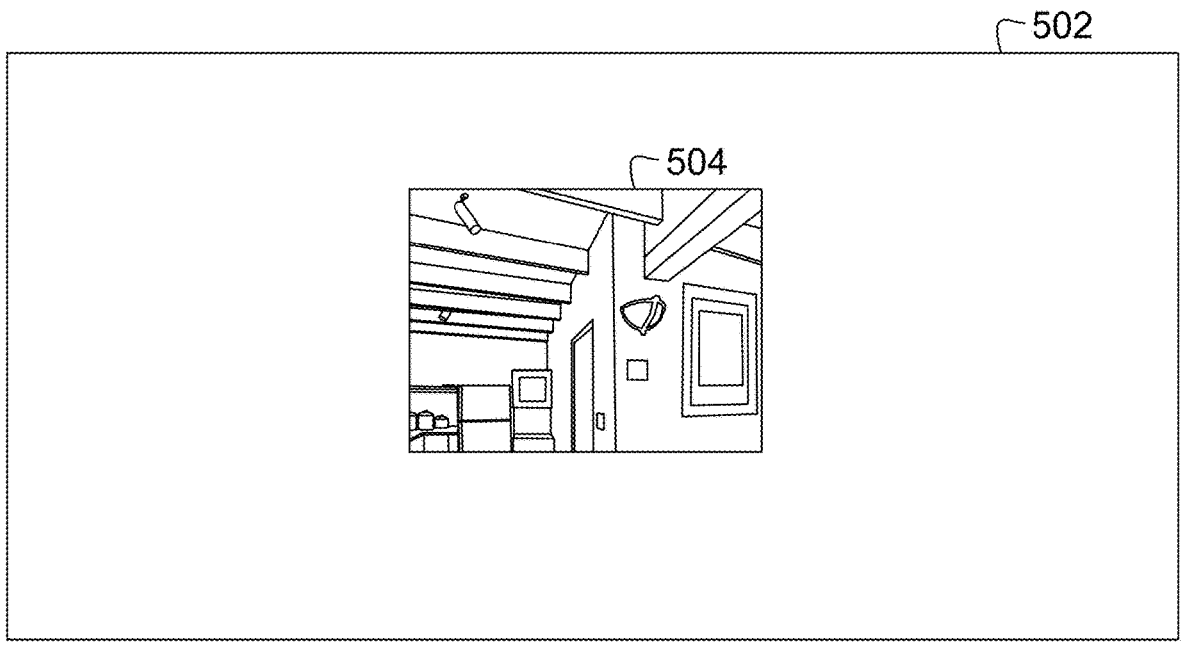
FIG. 5 depicts an example training panoramic image and training input image used to train the neural network system, in accordance with embodiments of the present disclosure.

In implementations, the training image component 306 extracts the training input images from training panoramic images. In this way, the training input images may also be referred to herein as a patch. For example, FIG. 5 depicts an example training panoramic image 502. A patch 504, which is a portion of panoramic image 502, may be extracted from training panoramic image 502 for use as an input image. For purposes of clarity, the imaged scene is depicted only in patch 504 and not in the surrounding panoramic image 502; however, it can be appreciated that the panoramic image 502 would depict portions of the scene extending out from what is shown in patch 504.

The training image component 306 may extract multiple patches from the training panoramic image, and each patch may be used as a different training input image. Accordingly, a single panoramic image of an indoor scene may provide multiple training input images. Each training input image, or patch, may represent a different portion or view of the panoramic image. In some aspects, the view of a training input image may partially overlap with a view of another training input image extracted from the same panoramic image; however, in other aspects, the views of each training input image from a single panoramic image are entirely distinct from one another.

Generally, the greater amount of training data available, the more accurate the neural network can become. Accordingly, some aspects of the training image component 306 perform data augmentation. Data augmentation includes modifying existing training images to create additional training images. Data augmentation techniques may include rotating images, mirroring images, changing color contrast levels, adjusting the overall brightness, and the like. Data augmentation may help to reduce overfitting caused by the neural network system.

Reference mask component 308 generates reference masks to be used to compare to output from the neural network system in order to train the network. As previously mentioned, when training the one or more neural networks in the neural network system, the training output generated is compared to references. As used herein, a reference refers to a standard, or ground truth, for evaluating the quality of the output generated by a neural network during training. In the disclosed implementations, the training output includes a training light recovery mask and/or a training low-frequency RGB image. Thus, there may be references for each training light recovery mask and for each training low-frequency RGB image.

In embodiments, the training panoramic images are RGB images and, therefore, the training panoramic images may be used as references for the training low-frequency RGB images. Light masks, on the other hand, are used as references for the training light recovery masks. In some implementations, these reference light masks are created by reference mask component 308.

The reference light masks indicate the actual position of light sources, such as spotlights, windows, strong reflections, etc., within a panoramic image. In exemplary aspects, the reference light masks are binary light masks that indicate whether each pixel within the panoramic image is either a light source or not a light source. For instance, any light sources within the panoramic image may be given a value of 1, while a value of 0 may indicate that a pixel does not significantly contributes to the scene illumination.

Figure 6:
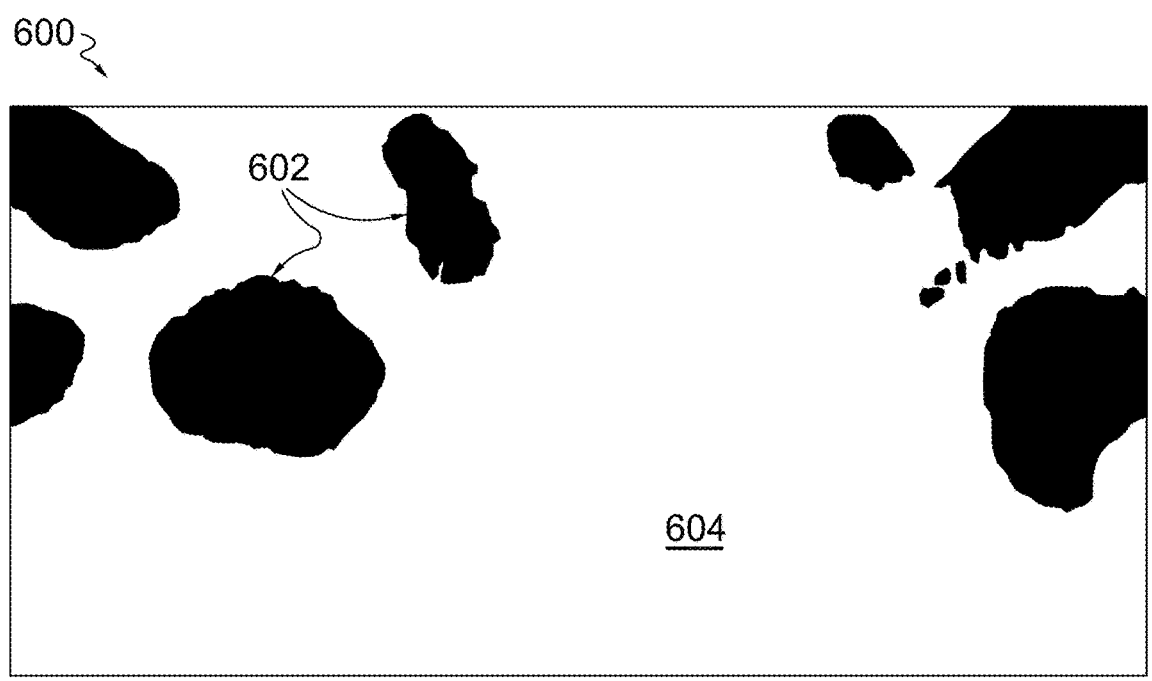
FIG. 6 depicts an example binary light mask generated in accordance with various embodiments of the present disclosure.

An example reference light mask 600 is depicted in FIG. 6. Reference light mask 600 of FIG. 6 may have been generated from training panoramic image 502 of FIG. 5. Accordingly, reference light mask 600 may be used as a reference for comparison to a recovery light mask generated from patch 504. The different classes represented by the mask (i.e., a pixel that is classified as a light source and a pixel that is classified as not a light source) are indicated through different colors. For instance, black may be used to represent pixels that are classified as being a light source, such as light sources 602 in light mask 600, while white may be used to represent pixels that are classified as not being a light source, such as non-light-source area 604. Reference light masks may also illustrate the different classifications using other color combinations.

These reference light masks may be created by one or more classifiers working to classify each pixel as a light source or not a light source. Because the reference light masks are used to compare to training recovery light masks that indicate illumination of an entire scene, the one or more classifiers operate on the whole panoramic image. In some aspects, the one or more classifiers operate on the panoramic image using a sliding window in which the classifiers view the whole panoramic image in a piecemeal fashion, such as by working on each patch within the panoramic image.

In some aspects, the reference light masks are created using two classifiers. A first classifier may be used to identify small or condensed light sources, such as spotlights and small lamps, while a second classifier may be used to identify larger light sources, such as windows and large area lights. These classifiers may both use linear support vector machine (SVM) as underlying models.

The classifiers may be trained to generate the reference light masks based on manually annotated data. This manually annotated data may be a subset of the training panoramic images that have had the light sources labeled manually. In this regard, creation of the reference light masks may involve manual annotation, but these manually annotated images are then used to train the classifiers, such as SVM classifiers, to automatically generate light masks for a larger set of panoramic images. For instance, in an embodiment reduced to practice, the manually annotated data included 400 samples, which was then used to train classifiers to create light masks for tens of thousands of training panoramic images.

Further, in some aspects, information relating to each patch within the panoramic image may extracted from the patches and used by the classifiers. For instance, descriptors for histogram of oriented gradients (HOG) may be extracted for each patch and used to detect objects within an image by detecting edges and may be used by the classifiers in creating the reference light masks. Additional information about patches extracted from the panoramic images may also be provided to the classifier. Such information may include the vertical position of the patch within the panoramic image and the mean color of the patch. This other information includes color and location information that is not included in the HOG descriptors but may be nonetheless useful to the classifier. For example, the vertical position may indicate whether a patch is more likely to depict a ceiling rather than a floor, and a light source being in the ceiling is more probability than a light source being on the floor.

In some aspects, reference light masks created via the SVM classifiers, such as the one illustrated in FIG. 6, are refined to produce a more accurate binary light mask. This refinement may be performed using a conditional random field to keep only semantically-related pixels in the areas indicated as being light sources. Other optimizations may be performed to produce a final reference light mask.

Training component 310 may select training input images generated by the training image component 306 for training a neural network system, such as to train a light mask neural network and/or an RGB image neural network within such a system. From the training input image, the light mask neural network may output a training recovery light mask, which may be compared to a corresponding reference light mask. A corresponding reference light mask is a reference light mask created from the panoramic image from which the training input image is extracted. Additionally, from the training input image, the RGB image neural network may output a training low-frequency RGB image, which may be compared to the corresponding panoramic image. Based on these comparisons, the training component 310 may adjust or modify the neural network system so that the neural network system becomes more accurate. The process of training the neural network system is discussed further with respect to FIG. 9.

The neural network system trained according to the present disclosure may be used to estimate illumination for images input into the system. Illumination estimation may be performed using illumination engine 312. The method of estimating illumination by generating light recovery masks and low-frequency RGB images from input images may be similar to the process described for training the neural network system; however, in execution, input images are typically not extracted from panoramic images. Accordingly, the environment or scene outside what is represented in the input images may be unknown, but the trained neural network system may, nevertheless, estimate illumination for the entire scene.

In embodiments, illumination engine 312 may run a trained neural network system to generate a light recovery mask and a low-frequency RGB image for an input image. An input image may be received from a user at a user device. The user may select or input an image in any available manner. For example, a user may take a picture using a camera on a device, for example, user device 202a of FIG. 2. As another example, a user may select a desired image from a repository stored in a data store accessible by a network or stored locally at the user device 202a of FIG. 2. In other embodiments, a user can input the image by inputting a link or URL to an image. Based on the input image, a recovery light mask and, in some aspects, a low-frequency RGB image, may be generated by illumination engine 312.

The recovery light mask and/or the low-frequency RGB image may be provided directly to a user via a user device, for example, user device 202a. In other aspects, the recovery light mask and the low-frequency RGB image are used to automatically adjust illumination of a selected image or object within an image to reflect the illumination estimated from the input image.

Figure 4:
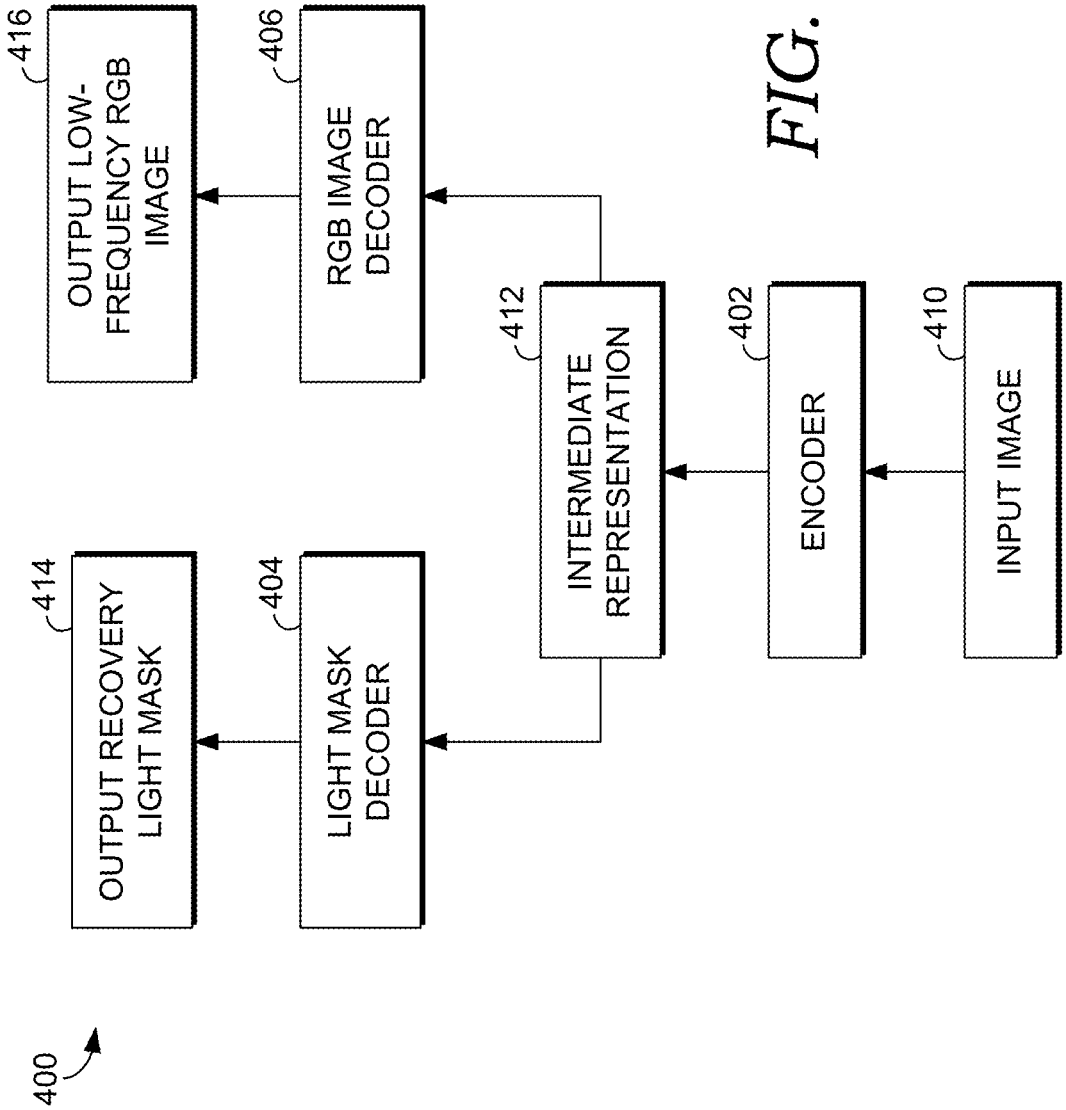
FIG. 4 provides an illustrative neural network system for estimating illumination of an environment from a single image, in accordance with embodiments of the present disclosure.

Turning to FIG. 4, an illustrative architecture for the neural network system 400 used for estimating illumination is provided. Neural network system 400 comprises an encoder 402, a light mask decoder 404, and an RGB image decoder 406. One or more of encoder 402, light mask decoder 404, and RGB image decoder 406 may each comprise a separate network, such as a neural network. For example, light mask decoder 404 may comprise light mask neural network, and RGB image decoder 406 may comprise RGB image neural network.

Encoder 402 encodes an input image 410, such as a standard RGB image, to an intermediate representation 412. Intermediate representation 412 comprises information that represents input image 410 in a form other than the format image is input into the system 400. Accordingly, intermediate representation 412 is a translation of input image 410. In some aspects, intermediate representation 412 comprises approximately 1024 floating point values. The floating point values are formulaic representations representing real numbers indicating color and/or brightness information for each pixel within input image 410. Although not depicted in FIG. 4, neural network system 400 may also receive surface normal values for input image 410 as input in addition to input image 410 itself. Surface normal values may have been previously determined for each pixel within input image 410 and indicate geometry of objects.

Subsequent to encoder 402, neural network system 400 separates into two branches: light mask decoder 404 representing one branch and RGB image decoder 406 representing the other branch. Light mask decoder 404 and RGB image decoder 406 may both operate from the same intermediate representation but perform different operations to provide different output. In this way, decoders 404 and 406 may be considered two independent tasks that together generate a realistic environment map that provides an illumination estimation.

Figure 7:
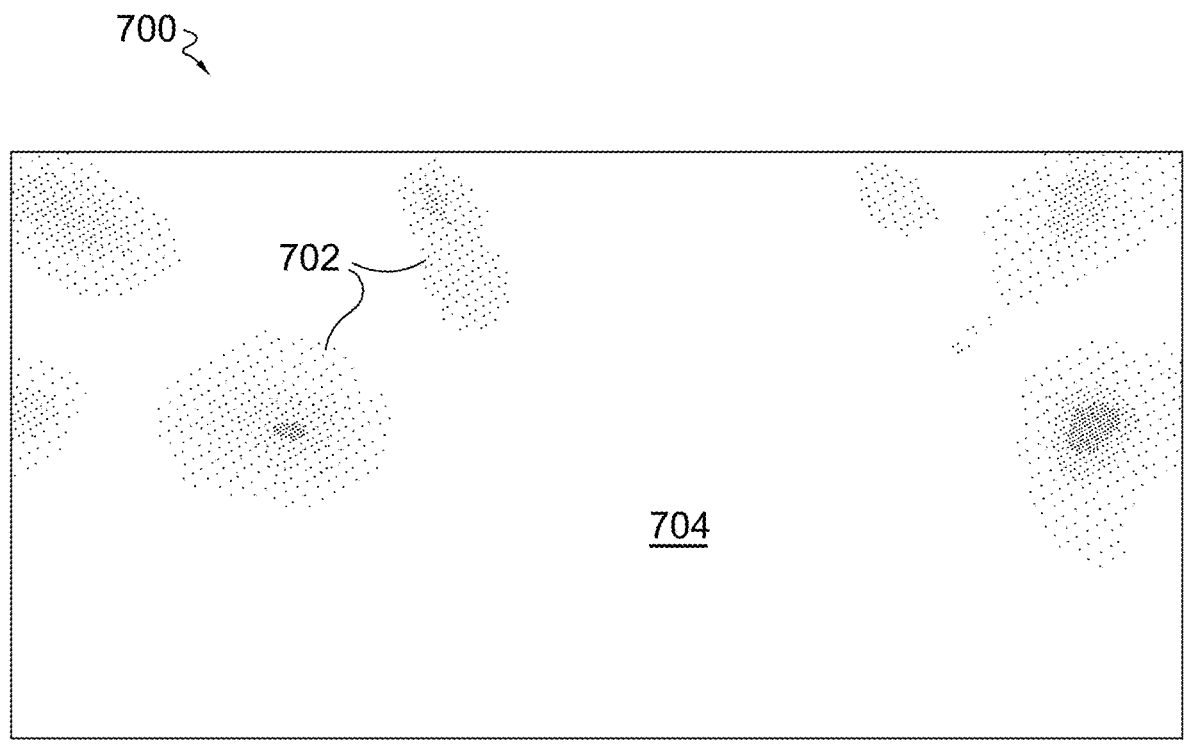
FIG. 7 depicts an example output recovery light mask generated in accordance with various embodiments of the present disclosure.

Light mask decoder 404 may use a series of subsequent up-convolution operations to generate output mask 414. Output mask 414 may comprise a 160×80 light mask. Output mask 414, also referred to herein as a recovery light mask, represents a panoramic environment that includes input image 410 and indicates a probability of each pixel of the panoramic environment being a light source. An example output mask 700 is illustrated in FIG. 7. Output mask 700 may have been generated for an input image, such as the one provided in FIG. 5. The mask may provide indicators of possible light sources, such as possible light sources 702. Output mask represents the entire panoramic environment, such as that shown in training panoramic 502 of FIG. 5, and indicates probabilities that each pixel within that panoramic environment is a light source.

The probabilities of being a light source represented in the training recovery light masks may be color-coded such that different colors represent a different probability or a different range of probabilities. For example, in one aspect, blue color or no color on the training recovery light mask may include a small probability of a pixel to be a light source, while yellow and red colors represent pixels having higher probabilities. For clarity, the different degrees of probabilities are illustrated in FIG. 7 by differing stippling densities. The low density or absence of stippling in output mask 700 represents areas with little to no probability of being a light source while areas of more concentrated stippling indicate higher probabilities.

As noted, the different colors or stippling densities may be indicative of different levels of probabilities of a pixel being a light source. However, where HDR images are used as input images, it is possible to determine relative brightness of the detected light sources as more image data can be gathered from HDR images. The varying degrees of brightness may also be represented by color coding, stippling effects, and the like.

Turning back to FIG. 4, RGB image decoder 406 generates output image 416. Output image 416 may comprise a 160×80 RGB image. Output image 416 is also referred to herein as low-frequency RGB image and may provide low-frequency information about the panoramic environment that includes input image 410. Such low-frequency information includes a coarse estimation of color distribution. This coarse estimation of color distribution indicates the general distribution of different colors around the panoramic environment without clear boundaries between different colors and items. An example low-frequency RGB image is provided in FIG. 8. As FIG. 8 demonstrates, the output RGB image may appear as a very blurry image, and such images may not illustrate definitive objects within the panoramic environment. But the output RGB image may generally depict average colors distributed around the panoramic environment and semantic distinctions between walls, floors, ceilings, and the like. For example, if there is a brick wall, the output RGB image may include an area with the low-frequency color, such as red, but may not depict the actual brick pattern. In this way, textures will not generally be shown in the output RGB image. Additionally, because the portion of the panoramic environment depicted in the input image is known, the pixels in the RGB image that correspond to the portion from the input image will generally have a higher resolution compared to other parts of the panoramic environment.

Table 1 below presents a detailed view of the architecture of the neural network system 400. As can be seen, except for the very first layers, encoder 402 uses residual blocks as layers. The operations referred to as up-convolution (also often designated as full convolution or inverse convolution) are layers that increase the size of their inputs through convolution. As used in Table 1, "Conv" indicates a normal convolution layer, "UpConv" indicates an up-convolution layer, and "Fully-conn." indicates a fully connected layer. A fully connected layer weights each pixels into a global sum to produce only one number per unit. Additionally, the dimensions within the descriptions in Table 1 correspond to filer dimensions (i.e., height×width and stride). In some embodiments, such as the one described in Table 1, there is no max-pooling layers. Instead, the image down-sampling may be done with the use of a stride greater than 1 in convolution layers.

TABLE 1

| Layer | Stage | Description | Output Dimensions |
| --- | --- | --- | --- |
| Input | Encoder | RGB input | 213 × 160 × 3 |
| Conv1 | Encoder | Conv, 4 × 4s2 | 106 × 80 × 64 |
| Conv2 | Encoder | Conv, 4 × 4s2 | 53 × 40 × 96 |
| Res1 | Encoder | Residual, 3 × 3s1 | 53 × 40 × 64 |
| Res2 | Encoder | Residual, 4 × 4s2 | 27 × 20 × 128 |
| Res3 | Encoder | Residual, 4 × 4s2 | 14 × 10 × 256 |
| Res4 | Encoder | Residual, 3 × 3s2 | 7 × 5 × 512 |
| FC1 | Encoder | Fully-conn., 1024 | 1024 |
| FC2 | Interm. Rep. | Fully-conn., 1024 | 1024 |
| FC3a | Mask dec. | Fully-conn., 121100 | 12800 |
| Conv3a | Mask dec. | UpConv, 4 × 4s2 | 20 × 10 × 256 |
| Conv4a | Mask dec. | UpConv, 4 × 4s2 | 40 × 20 × 128 |
| Conv5a | Mask dec. | UpConv, 4 × 4s2 | 80 × 40 × 128 |
| Conv6a | Mask dec. | UpConv, 4 × 4s2 | 160 × 80 × 64 |
| Conv7a | Mask dec. | Conv, 5 × 5s1 | 160 × 80 × 1 |
| Output | Mask dec. | Mask output | 160 × 80 × 1 |
| FC3b | RGB dec. | Fully-conn., 121100 | 12800 |
| Conv3b | RGB dec. | Conv, 3 × 3s1 | 10 × 5 × 256 |
| Conv4b | RGB dec. | UpConv, 4 × 4s2 | 20 × 10 × 256 |
| Conv5b | RGB dec. | Conv, 3 × 3s1 | 20 × 10 × 256 |
| Conv6b | RGB dec. | UpConv, 4 × 4s2 | 40 × 20 × 256 |
| Conv7b | RGB dec. | Conv, 3 × 3s1 | 40 × 20 × 128 |
| Conv8b | RGB dec. | UpConv, 4 × 4s2 | 80 × 40 × 128 |
| Conv9b | RGB dec. | Conv, 3 × 3s1 | 80 × 40 × 128 |
| Conv10b | RGB dec. | UpConv, 4 × 4s2 | 160 × 80 × 64 |
| Conv11b | RGB dec. | Conv, 3 × 3s1 | 160 × 80 × 48 |
| Conv12b | RGB dec. | Conv, 5 × 5s1 | 160 × 80 × 3 |
| Output | RGB dec. | RGB output | 160 × 80 × 3 |

In some aspects, an exponential linear unit is used for an activation function for all layers except for the output layers. For instance, the mask output layer may use a sigmoid activation function, while the RGB output layer may use hyperbolic tangent (tan h). Further, in some aspects, batch normalization is performed after each layer except for the output layers. Additionally, in some aspects, dropout may be used to improve the generalization ability of the network. However, in other aspects, dropout is omitted to reduce the length of training times. Overall, in exemplary implementations, the neural network system may have approximately 70 million trainable parameters.

In other aspects not illustrated, neural network system 400 further includes a texture network. Generally, texture recovery is not possible because textures do not generate any light, and, therefore, the input images would not provide information on textures outside the view of the input image. However, textures may be hallucinated such that textures matching the recovered RGB image and recovery light mask may be created. Hallucinated textures may provide output that not only identifies sources of light but begins morphing them into particular objects, such as windows or lamps.

The texture network for hallucinating textures from the output mask 414 (i.e., the light recovery mask) and output image 416 (i.e., the low-frequency RGB image) may be a generative adversarial network comprising a generator network and a discriminator network. The discriminator network may comprise a convolution neural network comprising a few convolutional layers followed by a fully-connected layer. During training, the discriminator network may provide feedback to the generator network about whether the produced image with texture hallucination looks like a corresponding reference image. The reference image may comprise the panoramic image from which the input image was extracted.

Example Flow Diagrams

With reference to FIG. 9, a flow diagram is provided to show an embodiment of a method 900 for training a neural network to estimate illumination of a panoramic environment from a single image, in accordance with embodiments of the present invention. Method 900 may be performed, for example, by training engine 304 of illumination estimator 302, as illustrated in FIG. 3.

At block 902, a plurality of training panoramic images is received. These images may be received from a data store, such as data store 318 of FIG. 3, and/or from an image database stored in the cloud. The training panoramic images may each depict an indoor scene and comprise a 360-degree view of the scene. It is also contemplated, however, that the training panoramic images comprise an angle of view that is less than 360 degrees. For example, one or more of the training panoramic images may comprise a 180-degree view.

At block 904, one or more training patches may be extracted from each training panoramic images. Each training patch may comprise an angle of view that is less than view of the training panoramic image from which the patch is extracted. For example, one or more training patches each comprising a 90-degree view may be extracted from a training panoramic image comprising a 360-degree angle of view. Where multiple patches are extracted from a single training panoramic image, the patches may have entirely distinct views of the scene or the patches may have views that are partially overlapping. Extracting the training patches may be performed by training image component 306 of the training engine 304 of FIG. 3.

At block 906, a training recovery light mask is generated for each training patch using a neural network. The training recovery light mask represents the entire panoramic environment that includes the view depicted in the training patch and indicates a probability that each pixel within that panoramic environment is a light source. The probabilities of being a light source represented in the training recovery light masks may be color coded such that different colors represent a different probability or a different range of probabilities.

In some embodiments, a training low-frequency RGB image may also be generated for each training patch using a neural network. Like the training recovery light mask, the training low-frequency RGB image represents the entire panoramic environment and may indicate low-frequency information, such as a coarse estimate of color distribution, for that environment. The neural network used to generate the low-frequency RGB images may be part of the same neural network system as the neural network utilized for generating the training light recovery masks.

The training recovery light mask and, in some aspects, the training low-frequency RGB images may be generated in a system similar to system 400 of FIG. 4. Specifically, a training input image may be encoded into an intermediate representation. In some aspects, the intermediate representation is 1024 floating point values. From the intermediate representation, the training recovery light mask and, in some aspects, the training low-frequency RGB images are generated. Although they both start from the same intermediate representation, the processes of generating the training recovery light mask and the training low-frequency RGB image from that intermediate representation may be independent of each other.

At block 908, each training recovery light mask is compared with a reference mask. The reference mask may comprise a binary light mask created for the training panoramic image from which the patch used to create the training recovery light mask was created and may be created by the reference mask component 308 of the training engine 304 of FIG. 3. In some aspects, the reference mask is created using a first SVM classifier to identify small light sources and a second SVM classifier to identify large light sources.

The reference mask may indicate whether each pixel within the panoramic environment has been classified as a light source or not a light source. Similarly, in aspects in which training low-frequency RGB images are generated, the training low-frequency RGB images are compared to reference images. The reference image may be the training panoramic image from which the patch used to create the training low-frequency RGB image was extracted.

These comparisons may include determining one or more loss function types. For example, the comparison between a training light recovery mask and a reference mask may include determining binary cross-entropy as a loss function, and the comparison between a training low-frequency RGB image and a reference image may include determining a L2 loss. It is contemplated that other types of loss functions may be used including, for instance, an adversarial term, an L3/L4/Ln loss, a masked loss, a render loss, and the like. In some aspects, for example, both an L2 loss and an adversarial loss are determined for the training low-frequency RGB image.

At block 910, the neural network may be adjusted based on the comparisons of the training recovery light masks to the reference masks. These adjustments may be based on the loss functions determined from comparing the training recovery light masks to the reference masks. Errors determined using loss functions may minimize the loss in the neural system in future iterations. In some embodiments, a neural network for generating low-frequency RGB images are similarly adjusted based on the comparisons of training low-frequency RGB images and reference images. The blocks of method 900 may be repeated any number of times to train the neural network system by using different training panoramas and corresponding reference information, such as reference masks and reference images, for each iteration. The training method utilized to train the neural network may include gradient descent, Adam optimizer, and the like.

In some aspects, method 900 further includes training the neural network system to hallucinate texture from a training recovery light mask and a corresponding training low-frequency RGB image. Hallucinating texture may be performed using a generative adversarial network that includes a convolutional neural network. The hallucinated texture may comprise an RGB image that is compared to the reference panoramic training image. An adversarial loss, or another loss function, may be determined from this comparison and use to adjust or modify the generative adversarial network to improve the network's performance.

FIG. 10 depicts a block diagram illustrating an example method 1000 for estimating illumination of a panoramic scene from a single image. Method 1000 may be performed, for example, by illumination engine 312 of the illumination estimator 302 of FIG. 3. Additionally, method 1000 may be performed utilizing neural network system 314 of FIG. 3 after the system has been trained.

At block 1002, an input image is received. The input image may depict an indoor scene and may include at least one of a wall, a floor, or a ceiling. The input image may have an angle of view of 100 degrees or less. Further, the training input images may comprise LDR images, such as a JPEG image, or HDR images. The input image may be received from a data store, such as data store 318 or may be received directly from a user's input such as through, uploading an image from a camera or inputting a like or URL to an image.

At block 1004, a trained neural network system is used to generate a recovery light mask for the input image. The neural network system may be trained in accordance with method 900 of FIG. 6. The recovery light mask, such as output mask 700 in FIG. 7, for the input image indicates a probability of each pixel within a panoramic environment being a light source. The panoramic environment is one that encompasses the view depicted in the input image and, unlike with the training input images, the panoramic environment is not necessarily known or depicted in another image available to the neural network system.

Figure 8:
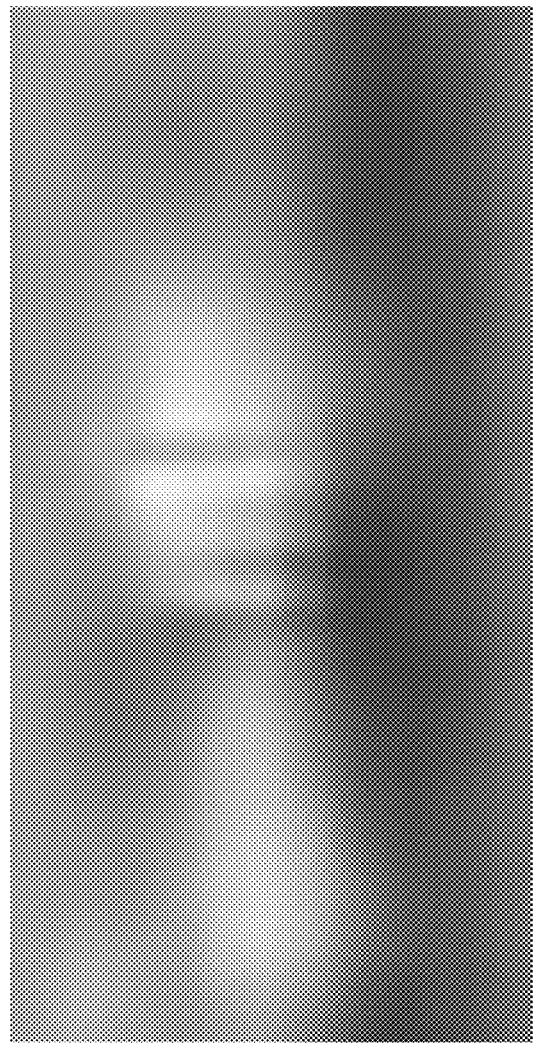
FIG. 8 provides a photograph of an example output low-frequency RGB image generated in accordance with various embodiments of the present disclosure.

At block 1006, the trained neural network system may be used to generate a low-frequency RGB image, such as low-frequency RGB image 800 of FIG. 8, from the input image. The low-frequency RGB image may indicate low-frequency information for the panoramic environment encompassing the input image. Such low-frequency information includes a coarse estimation of color distribution.

The recovery light mask and the low-frequency RGB image may be created in a neural network system having an architecture similar to system 400 of FIG. 4. For example, the input image may be run through an encoder network to encode the input image to an intermediate representation of 1042 floating point values. From that intermediate representation, a mask decoder network may create the recovery light mask while an RGB image decoder network may create the low-frequency RGB image. In some aspects, predicted surface normal values for the input image are determined and used with the input image to generate the recovery light mask and low-frequency RGB image.

The recovery light mask and low-frequency RGB image may then be provided for display to a user. Additionally or alternatively, the recovery light mask and low-frequency RGB image may be used to automatically adjust the illumination of all or a portion of an image. The image being adjusted may include the input image, a copy of the input image, or another image or digital file. For example, when a user is compositing an object into the input image, the recovery light mask and low-frequency RGB image for the original input image may be used to automatically adjust the illumination of the object within the composited image to achieve a realistic appearance and integration of the composite object. Further, in some aspects, the coloring of one or more aspects of an image may be automatically adjusted using the recovery light mask and low-frequency RGB image.

Additionally, in some aspects, the method further comprises generating a texture hallucination from the recovery light mask and low-frequency RGB image. The texture hallucination may be generated using a generative adversarial network comprising a discriminator network and a generator network.

Example Operating Environment

Having described an overview of embodiments of the present invention, an exemplary operating environment in which embodiments of the present invention may be implemented is described below in order to provide a general context for various aspects of the present invention. Referring now to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. One or more non-transitory computer-readable media having a plurality of executable instructions embodied thereon, which, when executed by one or more processors, cause the one or more processors to perform a method for estimating illumination of images, the method comprising:
    receiving an input image of an indoor scene, wherein the input image depicts a view of the indoor scene that is less than 360 degrees;
    encoding the input image to an intermediate representation; and
    utilizing a trained neural network system to generate, from the intermediate representation, a recovery light mask and low-frequency RGB image each representing a panoramic environment encompassing the view depicted in the input image, wherein utilizing the trained neural network system includes:
        generating the recovery light mask utilizing a first branch of the neural network system, wherein the recovery light mask indicates a probability of each pixel representing an area within the panoramic environment being a light source, wherein at least some pixels in the recovery light mask represent part of the panoramic environment that is beyond the view depicted in the input image, and
        generating the low-frequency RGB image indicating low-frequency information utilizing a second branch of the neural network system.

2. The media of claim 1, wherein the panoramic environment represents a 360-degree view.

3. The media of claim 1, wherein the low-frequency information indicated by the low-frequency RGB image comprises a coarse estimation of color distribution within the panoramic environment.

4. The media of claim 1, wherein the method further comprises using a training method comprising:
    training a first neural network to generate recovery light masks based on comparisons of binary light masks and training recovery light masks generated by the first neural network from training images, the first neural network forming the first branch of the neural network system; and
    training a second neural network to generate low-frequency RGB images based on comparisons of training panoramic images and training low-frequency RGB images generated by the second neural network from the training images, each training image being a portion of a training panoramic image, the second neural network forming the second branch of the neural network system.

5. The media of claim 4, wherein the method further comprises generating the binary light masks using one or more linear support vector machine classifiers, each binary light mask indicating whether each pixel within a training panoramic image is classified as a light source.

6. The media of claim 5, wherein the one or more linear support vector machine classifiers comprise a first classifier for small light sources and a second classifier for large light sources.

7. The media of claim 5, wherein the method further comprises refining the binary light masks using conditional random field.

8. A computer-implemented method for estimating illumination of images, the method comprising:
    receiving an input image of an indoor scene, wherein the input image depicts a view of the indoor scene that is less than 360 degrees;

encoding the input image to an intermediate representation; and utilizing a trained neural network system to generate, from the intermediate representation, a recovery light mask and low-frequency RGB image each representing a panoramic environment encompassing the view depicted in the input image, wherein utilizing the trained neural network system includes:

generating the recovery light mask utilizing a first branch of the neural network system, wherein the recovery light mask indicates a probability of each pixel representing an area within the panoramic environment being a light source, and wherein at least some pixels in the recovery light mask represent part of the panoramic environment that is beyond the view depicted in the input image; and generating the low-frequency RGB image indicating low-frequency information utilizing a second branch of the neural network system.

9. The computerized method of claim 8, wherein the low-frequency information indicated by the low-frequency RGB image comprises a coarse estimation of color distribution within the panoramic environment.

10. The computerized method of claim 8, wherein the input image depicts a 60-degree view and the panoramic environment represents by the recovery light mask is a 360-degree view.

11. The computerized method of claim 8, wherein pixels within the recovery light mask that have different probabilities representing a light source are assigned different colors.

* * * * *